(12) United States Patent
Kato et al.

(10) Patent No.: US 6,206,343 B1
(45) Date of Patent: Mar. 27, 2001

(54) SOLENOID VALVE

(75) Inventors: Masaaki Kato; Kazuhiko Maeda, both of Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/320,442

(22) Filed: May 27, 1999

(30) Foreign Application Priority Data

May 27, 1998 (JP) .................................................. 10-146229

(51) Int. Cl.[7] .............................. F16K 31/02; H01F 5/00; H01F 3/00; H01F 7/00
(52) U.S. Cl. .................... 251/129.15; 335/261; 335/281; 335/301
(58) Field of Search ....................... 251/129.15; 335/261, 335/279, 281, 301

(56) References Cited

U.S. PATENT DOCUMENTS

| 4,826,130 | * | 5/1989 | Griffith et al. | 251/129.15 |
| 5,509,439 | * | 4/1996 | Tantardini | 137/269 |
| 5,538,219 | * | 7/1996 | Osterbrink | 251/129.15 |

FOREIGN PATENT DOCUMENTS 6-123378   5/1994   (JP) .

* cited by examiner

Primary Examiner—Kevin Shaver
Assistant Examiner—D Austin Bonderer
(74) Attorney, Agent, or Firm—Reed Smith Hazel & Thomas LLP

(57) ABSTRACT

A solenoid valve of a type wherein a yoke is provided thereon with a coil, a plunger arranged in the yoke coaxial therewith so as to be brought into a linear movement upon excitation of the coil and characterized in that a coating, such as Teflon®, is provided on at least one of an outer surface of the plunger and an inner surface of the yoke.

2 Claims, 4 Drawing Sheets

SOLENOID VALVE

BACKGROUND OF THE INVENTION

1. Field of the Invention

The present invention is directed to a solenoid valve for use with a transmission device in automotive vehicles and, in particular, to a linear solenoid valve wherein a plunger is brought into linear movement when current is applied to a coil.

2. Description of the Prior Art

A conventional solenoid valve such as one disclosed in Japanese Patent Laid-open Publication No. Hei. 6 (1994)-123378 includes a coil wound around a bobbin, first and second yokes mounting thereon opposite sides of the bobbin, respectively, first and second bearings disposed in the respective first and second yokes, and a plunger disposed within the bobbin such that opposite ends of the plunger are supported by the respective first and second bearings, the plunger being brought into linear mode movement upon excitation of the coil.

For establishing smooth or reliable movement of the plunger, magnetic isolation between the plunger and each yoke must be formed in a uniform manner. To this end, in the conventional solenoid valve, an air gap is defined between the plunger and the yoke which is in the form of an annular ring in cross-section.

On the other hand, the plunger sometimes comes out of alignment with each of the yokes or an inclination condition may occur due to an assembly error of the bearing to the corresponding yoke.

Thus, the air gap should be of a sufficient width to prevent direct contact between the plunger and each yoke even though the plunger is brought into the inclination condition.

Such an air gap of sufficient width constitutes dead space in the solenoid valve, however, resulting in a solenoid valve larger in scale.

SUMMARY OF THE INVENTION

It is, therefore, one of the objects of the present invention to provide a solenoid valve without the foregoing drawbacks.

In order to attain the foregoing objects, the present invention provides a solenoid valve which comprises: a housing formed of a metal; a yoke accommodated in the housing and formed of magnetic material such that a non-magnetization portion is provided at a midway portion thereof; a coil wound around the yoke; a plunger arranged within the yoke coaxially with the yoke and moving in linear mode upon excitation of the coil; and a coating treatment made on at least one of an outer surface and an inner surface of the yoke so as to establish magnetic isolation evenly between the yoke and the plunger.

BRIEF DESCRIPTION OF THE DRAWING

The above and other objects, features and advantages of the present invention will be more apparent and readily appreciated from the following detailed description of preferred exemplary embodiments of the present invention, taken in connection with the accompanying drawings, in which.

DETAILED DESCRIPTION OF THE PREFERRED EMBODIMENT

Preferred embodiments of the present invention will be described hereinafter in detail with reference to the accompanying drawings.

Figure 1:
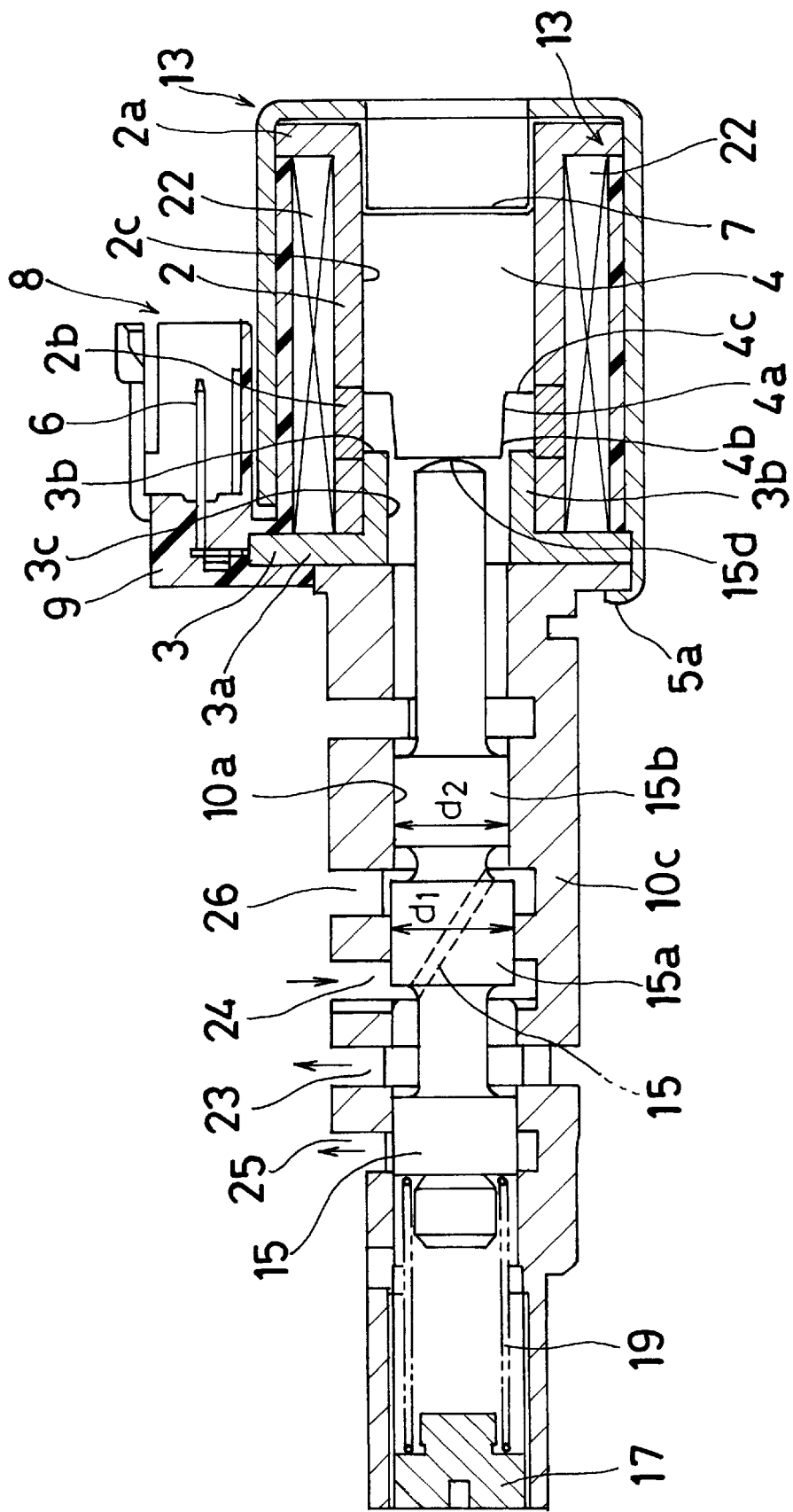
FIG. 1 is a cross-sectional view of a solenoid valve which is in no-excited condition according to a first embodiment of the present invention.

Reference is first made to FIG. 1, which illustrates a solenoid valve 1 in its non-excited condition. The solenoid valve 1 is used, for example, in a transmission device (not shown) for automotive vehicles. The solenoid valve 1 includes a cylindrical yoke 2 having at its one end a flange 2a and formed of an iron family magnetic material, such as sintered unoriented materials (hereinafter "SUM"). The other end of the yoke 2 is fitted therein with a yoke 3 formed of the same magnetic material as the yoke 2 in a pressed or snug manner such that an axially extending boss 3b of the yoke 3 is received in an inner surface 2c of the yoke 2 and an annular stepped portion 3b is formed therebetween.

Near the stepped portion 3b, the yoke 2 is provided integrally with a preformed non-magnetization portion 2b which extends circumferentially therefrom. In order to establish such a non-magnetization portion 2b, a penetration of an admixture material including Ni as a major component of the iron family magnetic material as the raw material of the yoke 2 such as SUM by means of laser beam emission or radiation. In detail, a portion to be reformed or modified whose raw material is an iron family magnetic material is wound with a thin nickel foil. When the portion under the resulting condition is illuminated by laser beam, the nickel is alloyed for bringing the portion into an austenite property.

Around the yoke 2 into which the yoke 3 is fitted in a snug manner, a coil 22 formed of a material of good electrical conductivity such as Nichrome wire is wound between the flanges 2a and 3a. Both ends of the coil 22 are connected electrically to respective L-shaped terminals 6 and 6 (only one is illustrated) by welding or soldering.

At this stage, the resultant condition of the device or an integral configuration of the yokes 2 and 3, the coil 22, and the terminals 6 and 6, etc., is placed in a molding device (not shown) and a resin molding is made such that an amount of synthetic resin in liquid phase is supplied into the molding device in order to obtain a sub assembly 13. It is desirable to employ a 6-6 nylon as the synthetic resin for improving heat resistance, and an inclusion of glass is recommended for reinforcing the 6-6 nylon. Thus, the resin formed sub assembly 13 is in the form of an integrated or one-piece configuration of the yokes 2 and 3, the coil 22 and the connector 8.

A plunger 4, which is formed of a magnetic material such as SUM, is provided in a sub assembly 13 such that the plunger 4 is slidable along the inner surface 2b of the yoke 2. The plunger 4 is provided at its left side or one end of the sliding direction with a stepped or radius-reduced portion 4c. A right end of the yoke 2 is plugged with a stopper 7 for restricting a rightward movement of the plunger 4. The stopper 7 is formed of a non-magnetic material. The resultant sub assembly 13 is inserted into a cup-shaped housing 5 form the left which is formed of a cold-rolled steel plate such as a pressed plate of SPCC.

In addition, a coating treatment using a tetrafluoroethylene (hereinafter "Teflon®") family material is provided on both the inner sides 2c of the yoke 2 and 3c of the yoke 3 for reducing sliding friction. Of course, such a coating treatment can be made on a whole outer surface of the plunger 4 in addition to or instead of the inner surfaces 2c and 3c of the respective yokes 2 and 3. The coating treatment using a Teflon® family treatment establishes an even annular magnetic isolation as small, as possible between the outer surfaces of both inner surfaces 2c and 3c of the respective yokes 2 and 3. Such an even annular magnetic isolation which is in the form of the coating using a Teflon® family material and which requires no sufficient air gap between the plunger and the yoke fails to occur the problems of the conventional solenoid valve as mentioned above.

A leftward movement of the plunger 4 can be established along the inner side 2c of the yoke 2 until the stepped portion 4c of the plunger 4 is brought into engagement with the stepped portion 3c of the yoke 3c. The plunger 4 is formed with a guide portion 4a extending from the stepped portion 4c along the inner side 3c of the yoke 3 and terminating in a tapered end 4b. The tapered end 4c makes an angle θ relative to the guide portion 4a for easy formation of the magnetic field.

When the sub assembly 13 is inserted in the housing 5 fully to its bottom, the coil 22 is covered with the housing 5. After abutting a right end of valve body 10 formed of, for example, aluminum, on a left side of the flange 3a of the yoke 3, riveting a distal end or a left end of the cup-shaped housing 5 brings an integral connection of the sub assembly 13, the valve body 10 and the housing 5.

Figure 2:
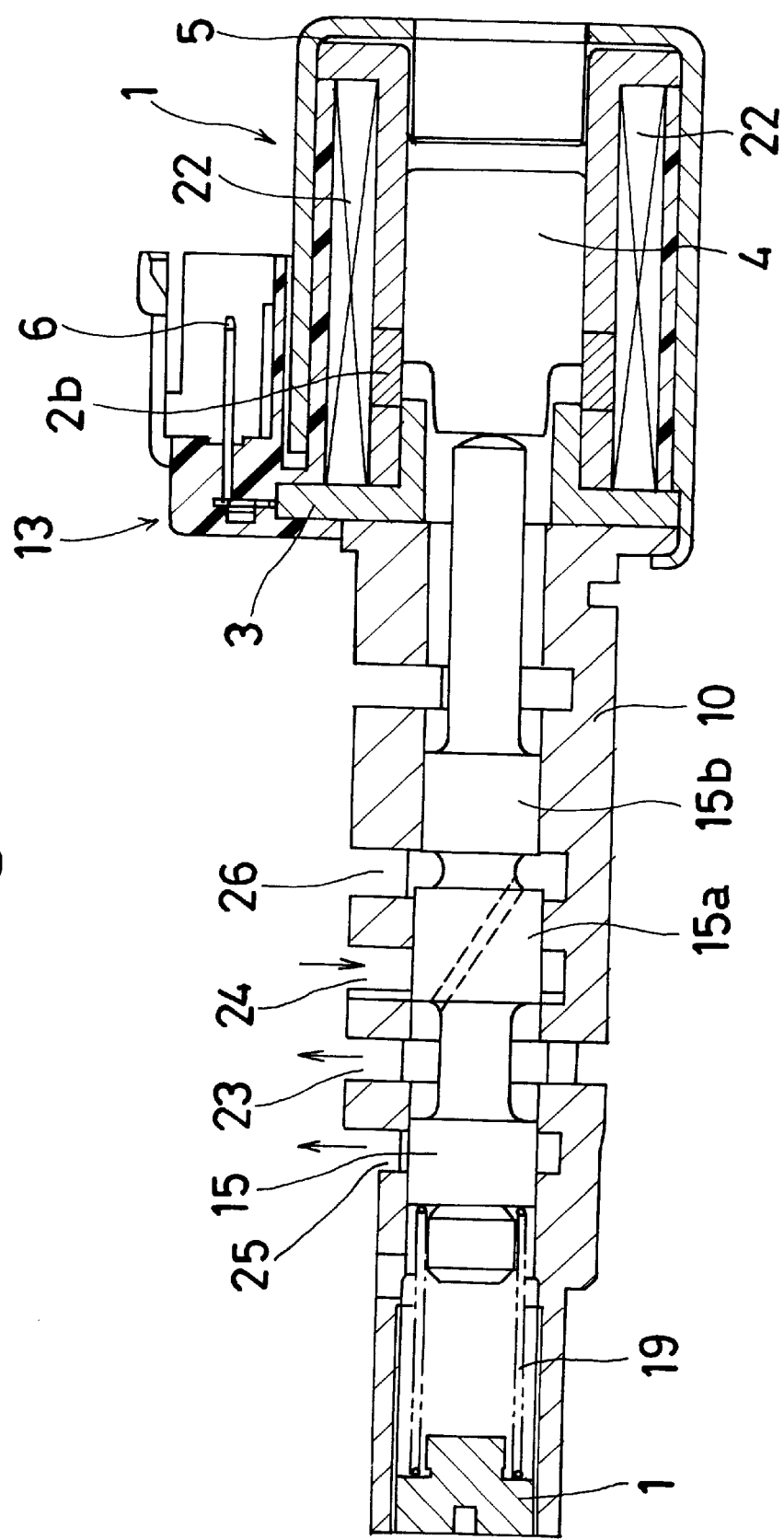
FIG. 2 is a cross-sectional view of the solenoid valve shown in FIG. 1 when it is in an excited condition.

The valve body 10 is formed therein with a cylinder portion 10a in which a spool valve 15 is slidably fitted. The valve body 10 is also provided therein with ports 23, 24, 25, and 26 which are in fluid communication with the cylinder portion 10a. The spool valve 15 is formed therein with a passage 15c which enables an establishment of a fluid communication between the ports 24 and 26. A left end of the valve body 10 is provided with a threaded plugged-in member 17. Between the plugged-in member 17 and the spool valve 15, there is disposed a spring 19 in compressed manner so as to urge the spool valve 15 in the rightward direction (FIG. 1). The ports 23, 24, and 25 of the valve body 10 act as an opening port, output port, and a drain port, respectively, for switching a hydraulic circuit in an automatic transmission (not shown). If the plunger 4 is moved upon excitation of the coil 22, the resultant movement of the spool valve 15, having a larger diameter portion 15a which is of a diameter d1 and a smaller diameter portion 15b which is of a diameter d2, establishes two different port-and-port communication as can be seen from FIGS. 1 and 2. It is to be noted that the following formula is established:

$$Fk = Fm + \pi/4 \cdot P \cdot (d1-d2) \cdot (d1-d2)$$

where

Fk: reaction force of the spring 19; and

Fm: force applied to the plunger 4 which is in proportion to current applied to the coil 22.

The plunger 4 is in abutment with the stopper 7, which is formed of the non-magnetic material, by being urged by the spring 19 via the spool valve 15.

In operation, as long as no electric current is applied to the coil 22, the plunger 4 is held between the stopper 7 and the spool valve 15, which is urged by the spring 19 as shown in FIG. 1.

When an electric current is applied to the coil 22 in such a manner that a power source (not shown) is connected across the terminals 6 and 6 which establishes a closed circuit including the coil 22, an attraction force is generated between the plunger 4 and a set of yokes 2 and 3 whose magnitude is in proportion to the magnitude of the electric current. In other words, energizing the coil 22 forms a magnetic field H which circulates along an endless path along a right side of the yoke 2, a left side of the plunger 4 which is magnetically isolated from the right side of the plunger 4 and the yoke 3, resulting in generation of two different poles at the stepped portion 3b of the yoke 3 and the tapered end 4b of the plunger 4. The resultant attraction force therebetween causes concurrent leftward movements of the plunger and the spool valve 15 which continue until the attraction force, depending on the magnitude of the applied current, balances with the urging force of the spring 19. A regulated pressure is generated at each port which depends on the rest position of the spool valve 5 and is ready for being supplied outside.

Figure 3:
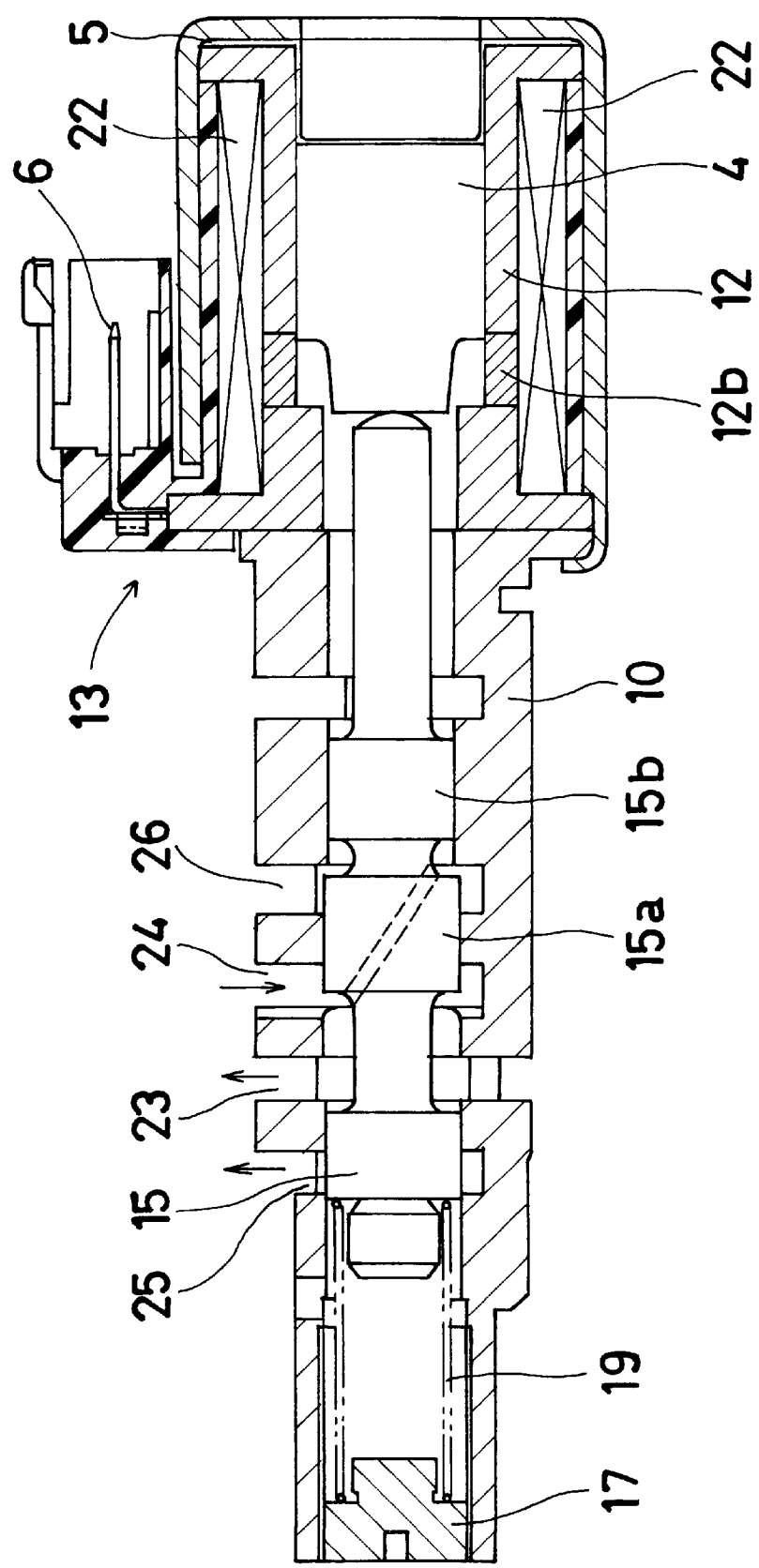
FIG. 3 is a cross-sectional view of a solenoid valve according to a second embodiment of the present invention.

Instead of the foregoing press-fitting of the yoke 3 into the yoke 2, a yoke 12 carrying the coil 22 therearound and having a non-magnetization portion 12b is provided and similarly can be employed, as shown in FIG. 3, which is an integrated form of the yokes 2 and 3. Such a structure offers decreasing the number of parts and easier alignment between two sides across the non-magnetization portion 12b in comparison with the structure shown in FIGS. 1 and 2.

Figure 4:
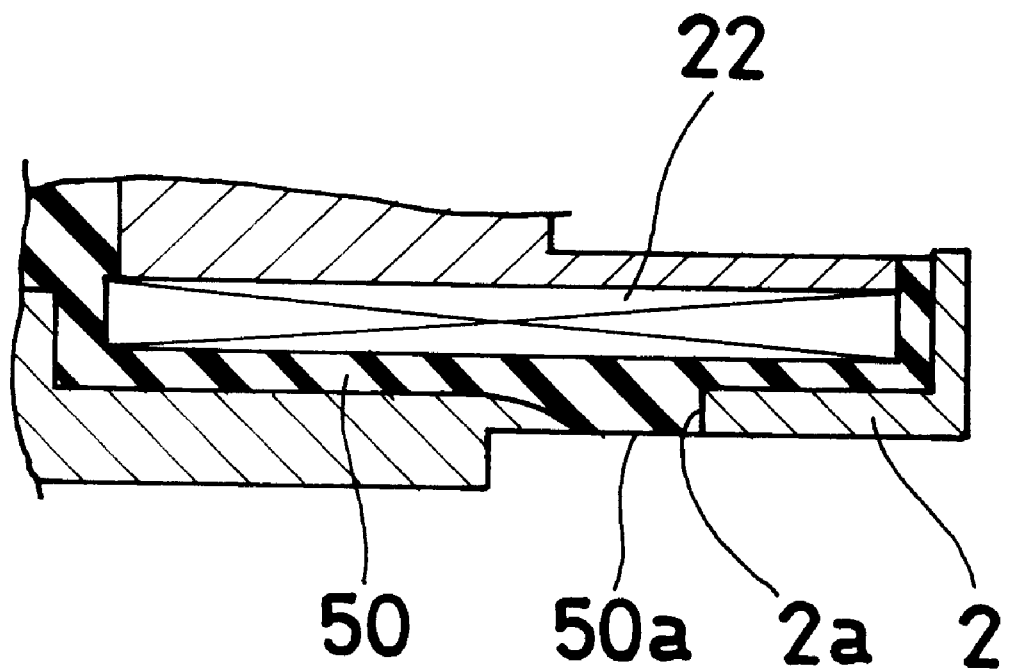
FIG. 4 is a partial view showing another mode of the non-magnetization portion of the yoke.

Instead of the non-magnetization portion 2b of the yoke 2, as shown in FIG. 4, it can be employed to insert an extension 50a of a bobbin 50 around which the coil 22 is wound on the yoke 2 into a hole 2x formed in the yoke 2.

While the invention has been described in conjunction with one of its preferred embodiments, it should be understood that changes and modifications may be made without departing from the scope and spirit of the appended claims.

What is claimed is:

1. A solenoid valve comprising:

a housing formed of a metal;
  a yoke accommodated in the housing and formed of magnetic material, said yoke including a non-magnetic ring formed at a midway portion of the yoke;
  a coil wound around the yoke;
  a plunger arranged within the yoke coaxially with the yoke and formed to move in linear mode upon excitation of the coil, wherein the non-magnetic ring is located in the yoke so as to be operatively positioned between the yoke and the plunger to thereby magnetically isolate at least a portion of the yoke from the plunger; and
  a coating treatment made on at least one of an outer surface of the plunger and an inner surface of the yoke so as to establish the magnetic isolation evenly between the yoke and the plunger.

2. A solenoid valve as set forth in claim 1, wherein the coating treatment uses a material such as tetrafluoroethylene.

* * * * *